(12) United States Patent
De Laurentis et al.

(10) Patent No.: US 7,589,749 B1
(45) Date of Patent: Sep. 15, 2009

(54) METHODS AND APPARATUS FOR GRAPHICAL OBJECT INTERACTION AND NEGOTIATION

(75) Inventors: Michael S. De Laurentis, Seattle, WA (US); Benjamin P. Bauermeister, Seattle, WA (US); Jason L. Staczek, Seattle, WA (US); Yohko A. F. Kelley, Woodinville, WA (US)

(73) Assignee: Adobe Systems Incorporated, San Jose, CA (US)

( * ) Notice: Subject to any disclaimer, the term of this patent is extended or adjusted under 35 U.S.C. 154(b) by 525 days.

(21) Appl. No.: 11/204,740

(22) Filed: Aug. 16, 2005

(51) Int. Cl.
G09G 5/00 (2006.01)
(52) U.S. Cl. ...................................... 345/676
(58) Field of Classification Search ......... 345/676–680; 715/837
See application file for complete search history.

(56) References Cited

U.S. PATENT DOCUMENTS 5,777,616 A * 7/1998 Bates et al. ................. 715/837
5,801,699 A * 9/1998 Hocker et al. ............... 715/837
6,031,531 A * 2/2000 Kimble ....................... 715/862
6,331,861 B1 * 12/2001 Gever et al. ................. 345/629

OTHER PUBLICATIONS

Scott E. Hudson, Adaptive Semantic Snapping—A Technique for Semantic Feedback at the Lxical Level, Year of Publication: 1990, Conference on Human Factors in Computing Systems, Proceedings of the SIGCHI conference on Human factors in computing systems: Empowering people, pp. 65-70.*

* cited by examiner

Primary Examiner—Jeffery A Brier
(74) Attorney, Agent, or Firm—Chapin IP Law, LLC; Barry W. Chapin, Esq.

(57) ABSTRACT

A system provides interaction between graphical objects and a managing application by detecting that movement of a first graphical object relative to a second graphical object on the graphical user interface is within a spatial proximity. In response to the detection of movement, the system notifies the first graphical object of presence information related to the second graphical object. The presence information includes at least an identity of the second graphical object. The system forms an association between the first graphical object and the second graphical object based on the presence information, and then graphically alters a representation of at least one of the first graphical object and the second graphical object on the graphical user interface in response to the formation of the association with each other.

31 Claims, 8 Drawing Sheets

204 IN RESPONSE, NOTIFY THE FIRST GRAPHICAL OBJECT OF PRESENCE INFORMATION RELATED TO THE SECOND GRAPHICAL OBJECT, THE PRESENCE INFORMATION INCLUDING AT LEAST AN IDENTITY OF THE SECOND GRAPHICAL OBJECT

205 USE THE MANAGEMENT APPLICATION, NOTIFYING THE FIRST GRAPHICAL OBJECT OF PRESENCE INFORMATION INCLUDING AT LEAST ONE OF:
i) AN INTERFACE THE SECOND GRAPHICAL OBJECT PUBLISHES
ii) DATA THE SECOND GRAPHICAL OBJECT PUBLISHES
iii) AN INTERFACE THE SECOND GRAPHICAL OBJECT CONSUMES
iv) DATA THE SECOND GRAPHICAL OBJECT CONSUMES 206 NOTIFY THE FIRST GRAPHICAL OBJECT OF ONLY AT LEAST ONE OF THE INTERFACES AND DATA PUBLISHED BY THE SECOND GRAPHICAL OBJECT THAT ARE CONSUMED BY THE FIRST GRAPHICAL OBJECT 207 NOTIFY THE SECOND GRAPHICAL OBJECT OF ONLY AT LEAST ONE OF THE INTERFACES AND DATA PUBLISHED BY THE FIRST GRAPHICAL OBJECT THAT ARE CONSUMED BY THE SECOND GRAPHICAL OBJECT

*FIG. 3*

216 FORM AN ASSOCIATION BETWEEN THE FIRST GRAPHICAL OBJECT AND THE SECOND GRAPHICAL OBJECT BASED ON THE PRESENCE INFORMATION

217 RECEIVE PRESENCE INFORMATION FROM THE SECOND GRAPHICAL OBJECT INDICATING AT LEAST ONE OF DATA AND INTERFACES AVAILABLE FOR COMMUNICATION WITH THE SECOND GRAPHICAL OBJECT

↓

218 RECEIVE PRESENCE INFORMATION FROM THE FIRST GRAPHICAL OBJECT INDICATING AT LEAST ONE OF DATA AND INTERFACES AVAILABLE FOR COMMUNICATION WITH THE FIRST GRAPHICAL OBJECT

OR

219 NEGOTIATE COMMUNICATION BETWEEN THE FIRST GRAPHICAL OBJECT AND THE SECOND GRAPHICAL OBJECT USING THE PRESENCE INFORMATION NOTIFIED TO THE FIRST AND SECOND GRAPHICAL OBJECTS BY THE MANAGEMENT APPLICATION, THE COMMUNICATION ALLOWING AN EXCHANGE OF OBJECT INFORMATION BETWEEN THE FIRST AND SECOND GRAPHICAL OBJECTS THAT IS NOT SUPPLIED BY THE MANAGING APPLICATION

↓

220 EXCHANGE OBJECT INFORMATION BETWEEN THE FIRST GRAPHICAL OBJECT AND THE SECOND GRAPHICAL OBJECT

231 GRAPHICALLY ALTER A REPRESENTATION OF AT LEAST ONE OF THE FIRST GRAPHICAL OBJECT AND THE SECOND GRAPHICAL OBJECT ON THE GRAPHICAL USER INTERFACE IN RESPONSE TO THE FORMATION OF THE ASSOCIATION WITH EACH OTHER

232 USE THE CONNECTION INFORMATION CONCERNING THE SECOND GRAPHICAL OBJECT TO RENDER, ON THE GRAPHICAL USER INTERFACE, THE PORTION OF THE FIRST GRAPHICAL OBJECT SELECTED BY THE USER TO APPEAR TO BE CONNECTED TO THE SECOND GRAPHICAL OBJECT

233 DETECT MOVEMENT OF AT LEAST ONE OF THE FIRST AND SECOND GRAPHICAL OBJECT ON THE GRAPHICAL USER INTERFACE

234 IN RESPONSE, ADJUST A GRAPHICAL APPEARANCE OF THE PORTION OF THE FIRST GRAPHICAL OBJECT CONNECTED TO THE SECOND GRAPHICAL OBJECT SO THAT THE PORTION REMAINS VISUALLY CONNECTED TO BETWEEN THE FIRST GRAPHICAL OBJECT AND THE SECOND GRAPHICAL OBJECT

OR

235 INSERT THE IMAGE OBJECT INTO THE TIMELINE OBJECT IN A SECTION ON THE TIMELINE WHERE A TIMESTAMP OF THE SECTION CORRESPONDS TO A TIMESTAMP OF THE IMAGE OBJECT

236 ALTER THE IMAGE OBJECT SUCH THAT THE TIMESTAMP OF THE IMAGE OBJECT IS VISIBLE TO A USER

*FIG. 7*

237 GRAPHICALLY ALTER A REPRESENTATION OF AT LEAST ONE OF THE FIRST GRAPHICAL OBJECT AND THE SECOND GRAPHICAL OBJECT ON THE GRAPHICAL USER INTERFACE IN RESPONSE TO THE FORMATION OF THE ASSOCIATION WITH EACH OTHER

238 DETECT A GRANULARITY OF PROXIMITY BETWEEN THE FIRST GRAPHICAL OBJECT AND THE SECOND GRAPHICAL OBJECT

239 ALTER A REPRESENTATION OF AT LEAST ONE OF THE FIRST GRAPHICAL OBJECT AND THE SECOND GRAPHICAL OBJECT, BASED ON THE GRANULARITY OF PROXIMITY

OR

240 CHANGE A VISUAL APPEARANCE OF AT LEAST ONE OF THE FIRST GRAPHICAL OBJECT AND THE SECOND GRAPHICAL OBJECT ON THE GRAPHICAL USER INTERFACE BASED ON PRESENCE INFORMATION EXCHANGED BETWEEN THE FIRST GRAPHICAL OBJECT AND THE SECOND GRAPHICAL OBJECT, THE PRESENCE INFORMATION INCLUDING A DISTANCE OF SPATIAL PROXIMITY BETWEEN THE FIRST AND SECOND GRAPHICAL OBJECTS

*FIG. 8*

METHODS AND APPARATUS FOR GRAPHICAL OBJECT INTERACTION AND NEGOTIATION

BACKGROUND

Conventional computerized devices, such as personal computers, laptop computers, and the like utilize graphical user interface in applications such as operating systems and graphical editors (i.e., web page editors, document editors, etc.) that enable users to quickly provide input and create documents and/or projects using "What You See Is What You Get" (WYSIWYG) technology. In general, using a graphical user interface, a user operates an input device such as a mouse or keyboard to manipulate graphical objects on a computer display. The graphical objects are often represented as icons and the user can operate an input device such as a mouse to move a mouse pointer onto an icon (i.e. graphically overlapping the icon) on the graphical user interface. By depressing a mouse button, the application such as the operating system desktop selects the icon and if the user maintains the mouse button in a depressed state, the user can drag the icon across the graphical user interface. By releasing the mouse button, the icon is placed on the graphical user interface at the current position of the mouse pointer.

Using graphical user interface technology, users can create and update documents (i.e., web pages, brochures, etc) and/or projects (i.e., a repository of notes, presentations, project timelines, organization charts, calendars, event planning, discussion threads, etc) by dragging and dropping graphical objects (i.e., text, text boxes, images, task lists, etc) into the document and/or project. A user can associate different objects (such as an image and a text box) with each other by performing an action (such as a mouse click, dragging and dropping one object over another object, etc) in order to link the two objects together. For example, a caption (i.e., a text box) can be associated with an image (i.e., a photograph) such that whenever the image is moved, the caption moves also with respect to the image. A user can also associate an object (such as a task list) to a project (such as a calendar). This association links the task list to the calendar so that any user viewing the calendar would have access also to the task list. A user can associate tasks within the task list with a date on the calendar on which those tasks are due to be completed. Thus, the task list and the calendar are integrated together to benefit users by presenting related information together.

SUMMARY

Conventional technologies for manipulating graphical objects (i.e., text, text boxes, images, task lists, icons, graphical widgets, etc.) within a graphical user interface, such as associating a graphical object with one or more projects (i.e., web pages, brochures, documents, a repository of notes, presentations, project timelines, organization charts, calendars, event planning, discussion threads, etc) suffer from a variety of deficiencies. In particular, conventional technologies for associating graphical objects with projects are limited in that a user has to manually associate the graphical objects with the respective projects, and determine how the two should be associated. For example, if a user wishes to associate a task within a task list to a date on a calendar project, the user must determine where in the calendar (i.e., which date on the calendar) the task belongs, and then manually associate the task with the date on the calendar project. In another example, if a user wishes to associate, for example, images of employees that are labeled with job titles, to matching job titles on an organization chart, a user must manually match each image labeled with a job title to the respective job title within the organization chart project. Requiring a user to manually perform these tasks leaves room for error (i.e., associating the task within the task list to the wrong date on the calendar, associating an image of an employee with the wrong job title within an organization chart, etc).

Additionally, conventional techniques for allowing a user to manipulate a graphical object such as an icon or a widget within a graphical user interface do not take into account other icons or widgets that may be nearby an icon that a user is moving on the graphical user interface. For example, if a user selects an icon that is displayed by an application running within the computer system, as the user moves that icon across a graphical user interface, the operating system handles redrawing that icon at various locations as the user moves the input device such as the mouse. Current conventional operating systems do not provide mechanisms to graphically alter the icon as it moves nearby other icons associated with other applications. Likewise, no infrastructure or framework is provided within conventional applications or operating systems to allow icons to be made aware of each other's presence when those icons are nearby each other.

Embodiments disclosed herein significantly overcome such deficiencies and provide a system that includes a computer system executing an object interacting process within a graphical user interface. The object interacting process detects that movement of a first graphical object relative to a second graphical object on the graphical user interface is within a spatial proximity. In response, the object interacting process notifies the first graphical object of presence information related to the second graphical object. The presence information includes, at the very least, an identity of the second graphical object. The object interacting process forms an association between the first graphical object and the second graphical object based on the presence information, and graphically alters a representation of at least one of the first graphical object and the second graphical object on the graphical user interface in response to the formation of the association with each other.

During an example operation of one embodiment, suppose a user is creating a project comprised of a time line, and a group of tasks having due dates that correspond to the dates within the timeline. As the user inserts a task within the project, in no special order, nor special position, a managing application process detects that the task has been placed near the timeline. The managing application then notifies the task of the proximity of the task to the timeline. The managing application also provides the task with presence information related to the time line. For example, the presence information could be the identity of the time line, an interface the time line publishes, data the time line publishes, an interface the time line consumes or data the time line consumes. The interfaces the timeline either publishes or consumes could be, for example, the handshaking that occurs between the task and the timeline. The data the time line publishes could be, for example, the due date associated with task. The date the time line consumes could be, for example, the identity of the task. An association is then formed between the task and the timeline. In one configuration, the association is formed by the managing application informing the timeline and the task of each other's presence information. In another example configuration, the association is formed by the timeline and the task communicating with each other to determine which interfaces are available with which to communicate, and what data available between the task and the timeline with which to exchange. Once communication has been established, the task or the timeline are graphically altered in response to the association that was formed between the timeline and the task. For example, the task may attach itself to a date in the timeline that corresponds to the due date of the task. In another example, the task identifies itself as being associated with the timeline by altering its appearance to include the name of the timeline. In yet another example configuration the task may attach itself to a date in the timeline that corresponds to the due date of the task without the timeline being aware that the task is attached.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc., of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when the object interacting process notifies the first graphical object of presence information related to the second graphical object, the presence information including at least an identity of the second graphical object, according to one embodiment disclosed herein.

FIG. 5 illustrates a flowchart of a procedure performed by the system of FIG. 1 when the object interacting process forms an association between the first graphical object and the second graphical object based on the presence information, according to one embodiment disclosed herein.

FIG. 7 illustrates a flowchart of a procedure performed by the system of FIG. 1 when the object interacting process graphically alters a representation of at least one of the first graphical object and the second graphical object on the graphical user interface in response to the formation of the association with each other, according to one embodiment disclosed herein.

FIG. 8 illustrates a flowchart of a procedure performed by the system of FIG. 1 when the object interacting process graphically alters a representation of at least one of the first graphical object and the second graphical object on the graphical user interface in response to the formation of the association with each other, according to one embodiment disclosed herein.

DETAILED DESCRIPTION

Embodiments disclosed herein include methods and a computer system that perform an object interacting process within a graphical user interface. The object interacting process detects that movement of a first graphical object relative to a second graphical object on the graphical user interface is within a spatial proximity. In response, the object interacting process notifies the first graphical object of presence information related to the second graphical object. In one configuration, the presence information includes at least an identity of the second graphical object. In one example configuration, the object interacting process forms an association between the first graphical object and the second graphical object based on the presence information, and graphically alters a representation of at least one of the first graphical object and the second graphical object on the graphical user interface in response to the formation of the association with each other. In one configuration, if a first graphical object is near a second graphical object, a managing application process recognizes the proximity of the two graphical objects and notifies the first graphical object that it is nearby the second graphical object, and the first graphical object can change it's representation. In one example configuration, a first graphical object is rendered on the graphical user interface by a first independently executing software process and the second graphical object is rendered on the graphical user interface by a second independently executing software process.

Figure 1:
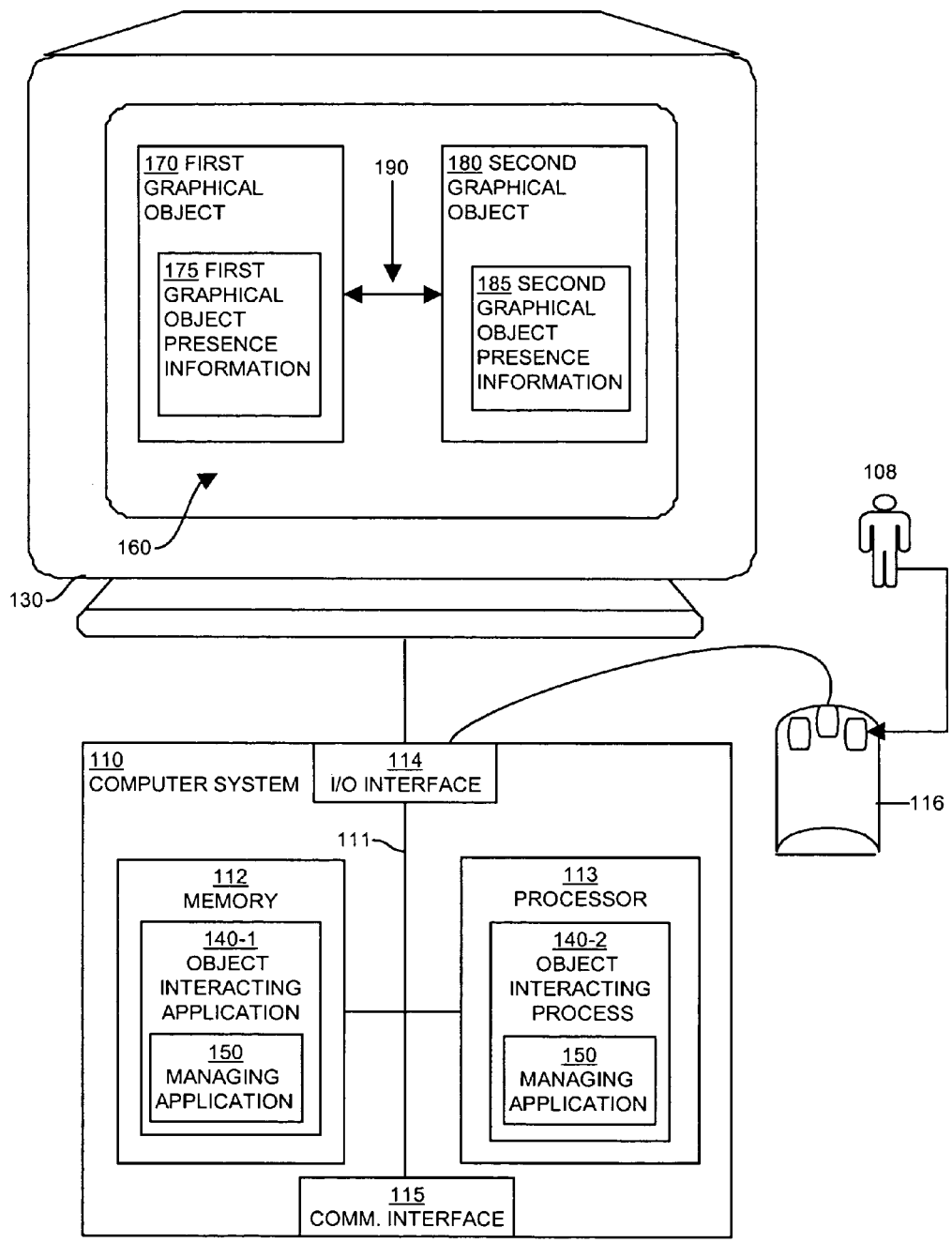
FIG. 1 shows a high-level block diagram of a computer system according to one embodiment disclosed herein.

FIG. 1 is a block diagram illustrating example architecture of a computer system 110 that executes, runs, interprets, operates or otherwise performs an object interacting application 140-1 and object interacting process 140-2 that includes a managing application process 150 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the object interacting application 140-1 and process 140-2 provides on the display 130. The graphical user interface 160 displays a first graphical object 170 containing first graphical object presence information 175, and a second graphical object 180 containing second graphical object presence information 185 in communication with each other via an association 190. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an object interacting application 140-1 that includes a managing application process 150 notifying the first graphical object 170 of second graphical object presence information 185 related to the second graphical object 185 as explained herein. The object interacting application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the object interacting application 140-1. Execution of the object interacting application 140-1 in this manner produces processing functionality in an object interacting process 140-2. In other words, the object interacting process 140-2 represents one or more portions or runtime instances of the object interacting application 140-1 (or the entire object interacting application 140-1) performing or executing within or upon the processor 113 in the computerized device 110 at runtime. The managing application process 150 is included in this processing and operates as explained herein to notify the first graphical object 170 of second graphical object presence information 185 related to the second graphical object 185.

It is noted that example configurations disclosed herein include the object interacting application 140-1 itself including the managing application process 150 (i.e., in the form of un-executed or non-performing logic instructions and/or data). The object interacting application 140-1 may be stored on a computer readable medium (such as a floppy disk), hard disk, electronic, magnetic, optical, or other computer readable medium. The object interacting application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the object interacting application 140-1 in the processor 113 as the object interacting process 140-2 including the managing application process 150. Those skilled in the art will understand that the computer system 110 may include other processes and/or software and hardware components, such as an operating system not shown in this example.

A display 130 need not be coupled directly to computer system 110. For example, the object interacting application 140-1 can be executed on a remotely accessible computerized device via the network interface 115. In this instance, the graphical user interface 160 may be displayed locally to a user 108 of the remote computer and execution of the processing herein may be client-server based.

Further details of configurations explained herein will now be provided with respect to a flow chart of processing steps that show the high level operations disclosed herein to perform the object interacting process 140-2.

Figure 2:
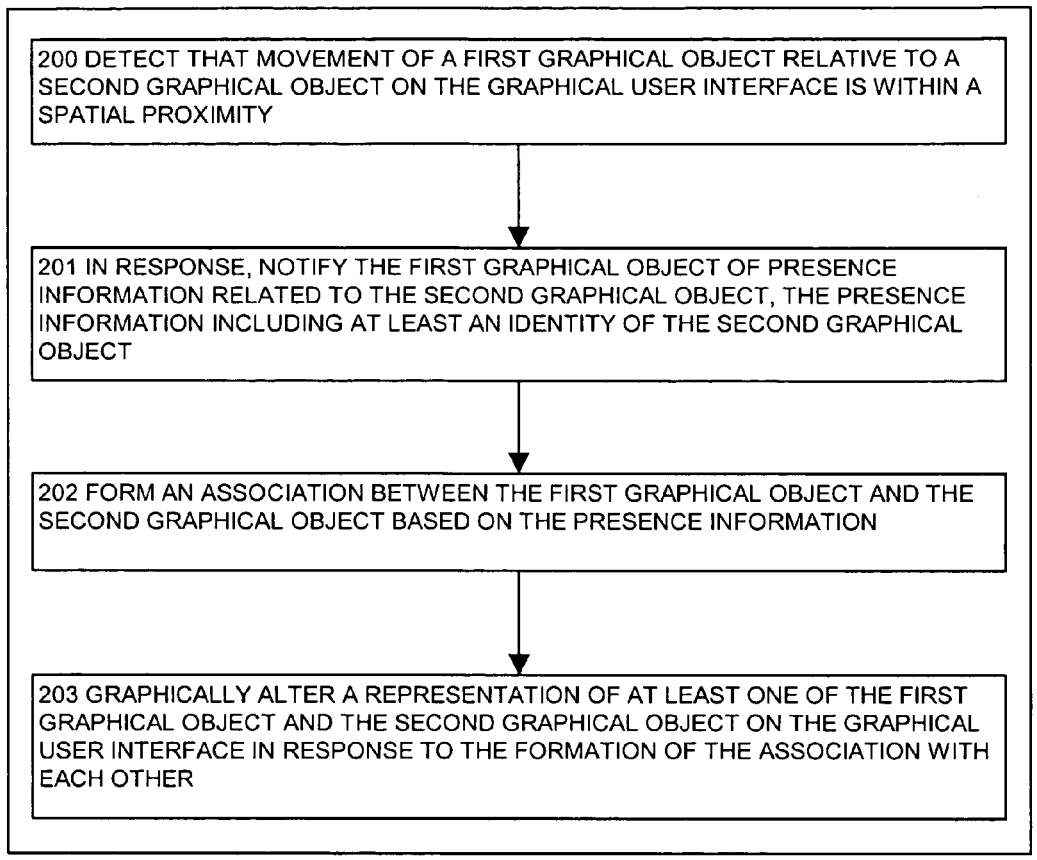
FIG. 2 illustrates a flowchart of a procedure performed by the system of FIG. 1 when the object interacting process detects that movement of a first graphical object relative to a second graphical object on the graphical user interface is within a spatial proximity, according to one embodiment disclosed herein.

FIG. 2 is a flowchart of the steps performed by the object interacting process 140-2 when it detects a first graphical object 170 has been placed close to a second graphical object 180. The first graphical object 170 is notified of second graphical object presence information 185 and forms an association 190 with the second graphical object 180.

In step 200, the object interacting process 140-2 detects that movement of a first graphical object 170 relative to a second graphical object 180 on the graphical user interface 160 is within a spatial proximity. In an example configuration, the managing application process 150 detects the spatial proximity of the first graphical object 170 to the second graphical object 180. In another example configuration, a first graphical object 170 or a second graphical object 180 can have, figuratively speaking, a radar that allows either graphical object to detect the presence of another graphical object. In an example configuration, the object interacting process detects that movement of a first graphical object relative to a second graphical object on the graphical user interface is based on the orientation between the first graphical object and the second graphical object.

In step 201, the object interacting process 140-2, in response to detecting the spatial proximity of the first graphical object 170 to the second graphical object 180, notifies the first graphical object 170 of second graphical object presence information 185 related to the second graphical object 180. The second graphical object presence information 185 includes, at the very least, an identity of the second graphical object 180. The second graphical object presence information 185 can include additional information that will be explained in further detail in the sub step of 205. In an example configuration, it is the second graphical object 180 that receives notification of first graphical object presence information 175 related to the first graphical object 170.

In step 202, the object interacting process 140-2 forms an association 190 between the first graphical object 170 and the second graphical object 180 based on the second graphical object presence information 185. The association 190 allows the first graphical object 170 and the second graphical object 180 to exchange information between them. For example, a text object, such as a caption (i.e., a first graphical object 170) could form an association with an image (i.e., a second graphical object 180). The image could exchange information with the caption, such as the timestamp of when the image was created that the caption, in turn, could then display. The caption could exchange information with the image, such as the text within the caption that the image could then use to rename itself so that it would be easier for a user to associate that image with the caption when viewing a list of images within a directory of images.

In step 203, the object interacting process 140-2 graphically alters a representation of at least one of the first graphical object 170 and the second graphical object 180 on the graphical user interface 160, in response to the formation of the association 190 with each other. For example, a first graphical object 170 and a second graphical object 180, such as two images, could align themselves together so that the tops of the images are in line with each other. Or, the two images could alter themselves such that they are both the same height and width.

FIG. 3 is a flowchart of the steps performed by the object interacting process 140-2. In step 204, the object interacting process 140-2, in response to detecting that movement of a first graphical object 170 relative to a second graphical object 180 on the graphical user interface 160 is within a spatial proximity, notifies the first graphical object 170 of second graphical object presence information 185 related to the second graphical object 180. The second graphical object presence information 185 includes at least an identity of the second graphical object 180.

In step 205, the object interacting process 140-2, using the management application process 150, notifies the first graphical object 170 of second graphical object presence information 185. The second graphical object presence information 185 could include at least one of;
  i) an interface the second graphical object 180 publishes
  ii) data the second graphical object 180 publishes
  iii) an interface the second graphical object 180 consumes
  iv) data the second graphical object 180 consumes.

The management application process 150 detects that movement of a first graphical object 170 relative to a second graphical object 180 on the graphical user interface 160. The management application process 150 also notifies the first graphical object 170 of second graphical object presence information 185 related to the second graphical object 180. In step 206, the object interacting process 140-2 notifies the first graphical object 170 only of at least one of the interfaces and/or data published by the second graphical object 180 that are consumed by the first graphical object 170. In one example configuration, the first graphical object 170 is not notified of any additional interfaces and/or data published by the second graphical object 180 that the first graphical object 170 does not consume. Thus, the second graphical object 180 could publish additional interfaces and/or data of which the first graphical object 170 is not notified.

In step 207, the object interacting process 140-2 notifies the second graphical object 180 only of at least one of the interfaces and data published by the first graphical object 170 that are consumed by the second graphical object 180. In one example configuration, the second graphical object 180 is not notified of any additional interfaces and/or data published by the first graphical object 170 that the second graphical object 180 does not consume. Thus, the first graphical object 170 could publish additional interfaces and/or data of which the second graphical object 180 is not notified.

Figure 4:
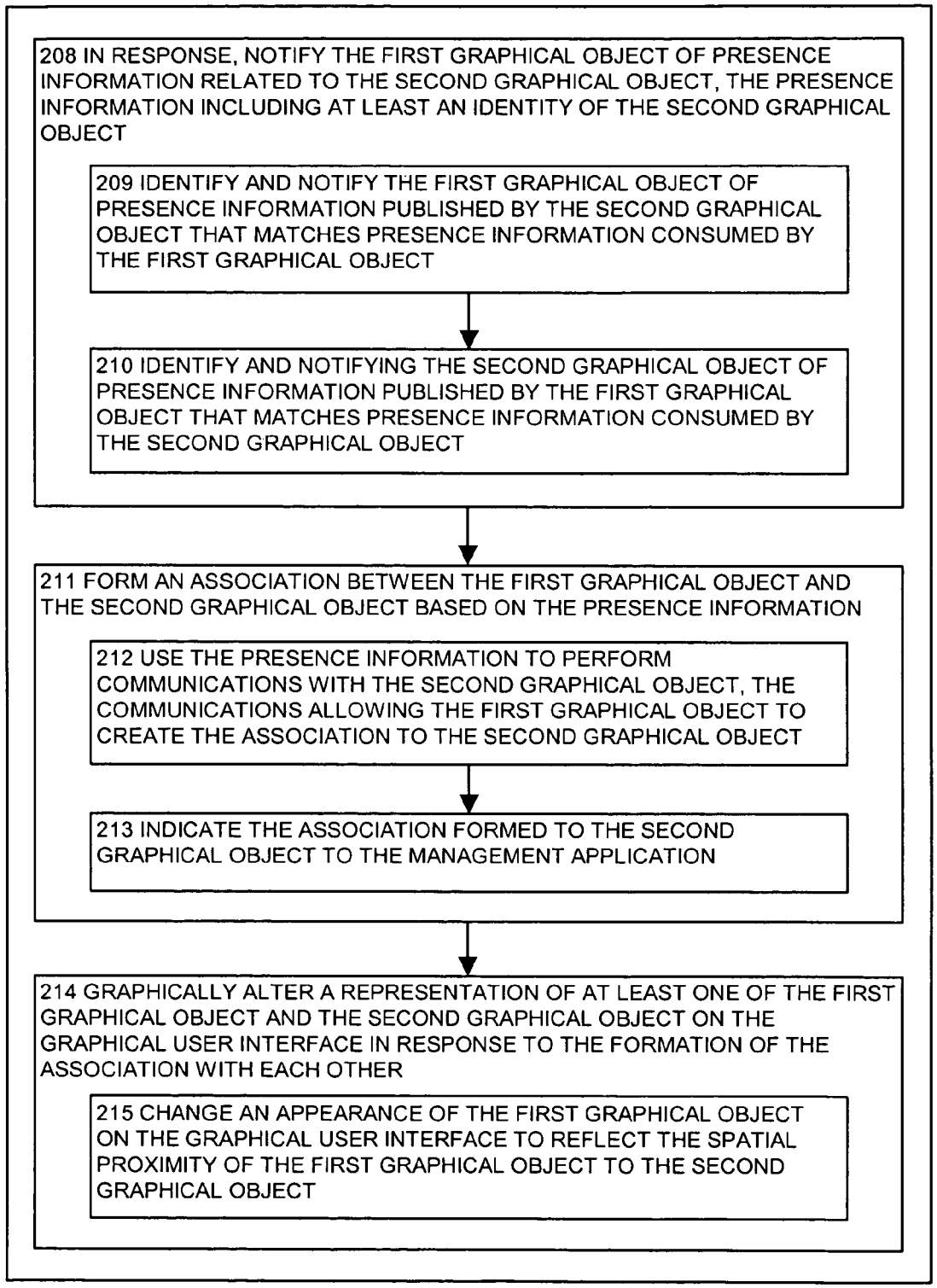
FIG. 4 illustrates a flowchart of a procedure performed by the system of FIG. 1 when the object interacting process notifies the first graphical object of presence information related to the second graphical object, the presence information including at least an identity of the second graphical object, according to one embodiment disclosed herein.

FIG. 4 is a flowchart of the steps performed by the object interacting process 140-2 when, in response to detecting that movement of a first graphical object 170 relative to a second graphical object 180 on the graphical user interface 160 is within a spatial proximity, notifies the first graphical object 170 of second graphical object presence information 185 related to the second graphical object 180. The second graphical object presence information 185 includes at least an identity of the second graphical object 180. Both the first graphical object 170 and the second graphical object 180 are notified of each other's presence information.

In step 209, the object interacting process 140-2 identifies and notifies the first graphical object 170 of second graphical object presence information 185 published by the second graphical object 180 that matches second graphical object presence information 185 consumed by the first graphical object 170. In one example configuration, it is the managing application process 150 that identifies which second graphical object presence information 185 published by the second graphical object 180 is consumed by the first graphical object 170, and notifies the first graphical object 170 of this information. The managing application process 150 maintains information related to which interfaces and/or data is published by each graphical object, and which interfaces and/or data is consumed by each graphical object in order to perform this step of identifying matching interfaces and/or data and notifying the respective graphical object.

In step 210, the object interacting process 140-2 identifies and notifies the second graphical object 180 of first graphical object presence information 175 published by the first graphical object 170 that matches first graphical object presence information 175 consumed by the second graphical object 180. In one example configuration, it is the managing application process 150 that identifies which first graphical object presence information 175 published by the first graphical object 170 is consumed by the second graphical object 180, and notifies the second graphical object 180 of this information.

The object interacting process 140-2 forms an association 190 between the first graphical object 170 and the second graphical object 180 based on the identified presence information. In step 212, the first graphical object 170 uses the second graphical object presence information 185 to perform communications with the second graphical object 170, the communications allowing the first graphical object 170 to create the association 190 to the second graphical object 180. In one example configuration, the second graphical object 180 is not aware that the first graphical object 170 has created this association 190 to the second graphical object 180.

In step 213, the first graphical object 170 indicates, to the managing application process 150, that the association 190 has been formed to the second graphical object 180. In one example configuration, the association 190 formed between the first graphical object 170 and the second graphical object 180 is dependent upon a distance of the spatial proximity between the first graphical object 170 and the second graphical object 180 on the graphical user interface 160. That is, different associations 190 are formed, based on the distance between the first graphical object 170 and the second graphical object 180. This concept will be explained in further detail in step 215.

In step 214, the object interacting process 140-2 graphically alters a representation of either the first graphical object 170 or the second graphical object 180, or both, on the graphical user interface 160 in response to the formation of the association 190 between the first graphical object 170 and the second graphical object 180. In step 215, the object interacting process 140-2 changes an appearance of the first graphical object 170 on the graphical user interface 160 to reflect the spatial proximity of the first graphical object 170 to the second graphical object 180. For example, if the first graphical object 170 and the second graphical object 180 are both images, and they form an association 190 when the distance between them is five units, the graphical objects may alter their appearance to align their top lines together or may alter themselves to be the same height and width. As the two graphical objects become even closer in special proximity, for example, two units apart, the two images (first graphical object 170 and second graphical object 180) may collapse together to create a picture show (i.e., a grouping of images where a user can view a slide show of all the images grouped together without the user having to individually open up each image).

FIG. 5 is a flowchart of the steps performed by the object interacting process 140-2. In step 216, the object interacting process 140-2 forms an association 190 between the first graphical object 170 and the second graphical object 180 based on the first graphical object presence information 175 and second graphical object presence information 185.

In step 217, the first graphical object 170 receives second graphical object presence information 185 from the second graphical object 180 indicating at least one of data and interfaces available for communication with the second graphical object 180. In this example configuration, the first graphical object 170 communicates directly with the second graphical object 180 to receive second graphical object presence information 185 from the second graphical object 180.

In step 218, the second graphical object 180 receives first graphical object presence information 175 from the first graphical object 170 indicating at least one of data and interfaces available for communication with the first graphical object 170. In this example configuration, the second graphical object 180 communicates directly with the first graphical object 170 to receive first graphical object presence information 175 from the first graphical object 170.

Alternatively, in step 219, the object interacting process 140-2 negotiates communication between the first graphical object 170 and the second graphical object 180 using the first graphical object presence information 175 and second graphical object presence information 185 notified to the first graphical object 170 and the second graphical object 180s by the managing application process 150. This communication allows an exchange of object information between the first graphical object 170 and second graphical object 180 that is not supplied by the managing application process 150. In this example configuration, the managing application process 150 has identified an association 190 between the first graphical object 170 and second graphical object 180 by notifying each graphical object of mutually compatible interfaces and/or data. The first graphical object 170 and second graphical object 180 then establish additional associations 190, exchanging of information using interfaces and/or data the first graphical object 170 and second graphical object 180 negotiate between the two of them, without the benefit of the managing application process 150 providing that information to the first graphical object 170 or second graphical object 180. The associations 190 established between the first graphical object 170 and the second graphical object 180 without the benefit of the managing application process 150 include interface and/or data of which the managing application process 150 has no knowledge.

In step 220, the object interacting process 140-2 exchanges object information between the first graphical object 170 and the second graphical object 180, using the associations 190 created between the two without the involvement of the managing application process 150.

Figure 6:
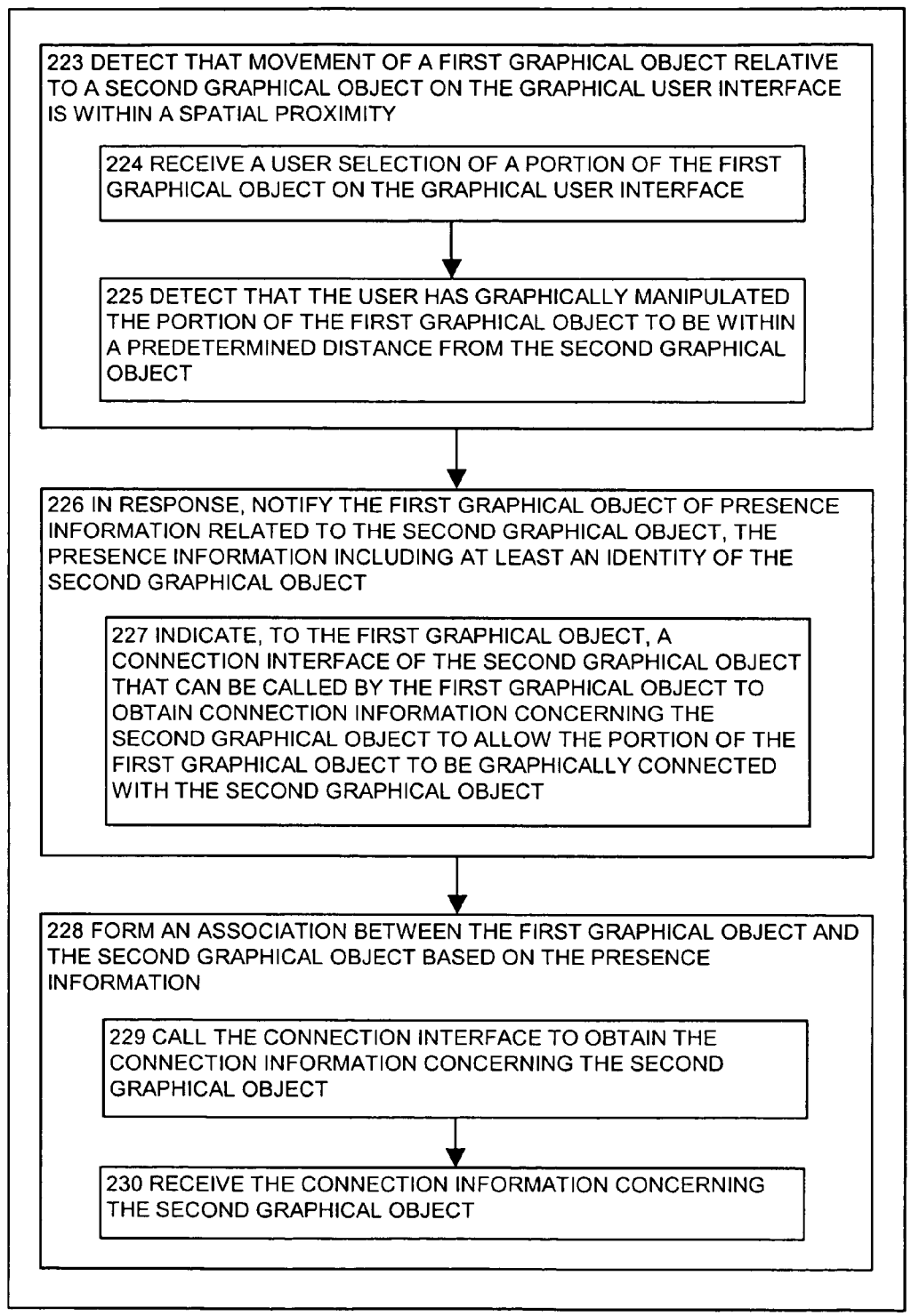
FIG. 6 illustrates a flowchart of a procedure performed by the system of FIG. 1 when the object interacting process detects that movement of a first graphical object relative to a second graphical object on the graphical user interface is within a spatial proximity, according to one embodiment disclosed herein.

FIG. 6 is a flowchart of the steps performed by the object interacting process 140-2. In step 223, the object interacting process 140-2 detects that movement of a first graphical object 170 relative to a second graphical object 180 on the graphical user interface 160 is within a spatial proximity.

In step 224, the first graphical object 170 receives a user selection of a portion of the first graphical object 170 on the graphical user interface 160. In an example configuration, the first graphical object 170 is a text object with a tail, and the second graphical object 180 is an image. A user 108 selects the tail of the text object (i.e., by clicking an input device 116, such as a mouse, on the 'tail' of the text object).

In step 225, the object interacting process 140-2 detects that the user 108 has graphically manipulated the portion of the first graphical object 170 to be within a predetermined distance from the second graphical object 180. For example, the user 108 may attach the tail of the text object to the second graphical object 180, such as an image to associate the text object with the image.

In step 226, in response to step 225, the object interacting process 140-2 notifies the first graphical object 170 of second graphical object presence information 185 related to the second graphical object 180. In step 227, the object interacting process 140-2 indicates, to the first graphical object 170, a connection interface of the second graphical object 180. This connection interface can be called by the first graphical object 170 to obtain connection information concerning the second graphical object 180 to allow the portion of the first graphical object 170 to be graphically connected with the second graphical object 180. In this example, the object interacting process 140-2 notifies the text object (i.e., the first graphical object 170) that interface on the image (i.e., the second graphical object 180) to which the text object can attach its tail.

In step 288, the object interacting process 140-2 forms an association 190 between the first graphical object 170 and the second graphical object 180 based on the supplied presence information. In Step 229, the first graphical object 170 calls the connection interface to obtain the connection information concerning the second graphical object 180. In this example, the text object (i.e., the first graphical object 170) calls the connection interface on the second graphical object 180 to obtain connection information with which to attach the tail of the text object (i.e., the first graphical object 170).

In step 230, the first graphical object 170 receives the connection information concerning the second graphical object 180. In this example, the text object (i.e., the first graphical object 170) receives the connection information the text object requested in step 229.

FIG. 7 is a continuation of the flowchart of the steps in FIG. 6 performed by the object interacting process 140-2. In step 231, the object interaction process 140-2 graphically alters a representation of at least one of the first graphical object 170 and the second graphical object 180 on the graphical user interface 160 in response to the formation of the association 190 with each other.

In step 232, the first graphical object 170 uses the connection information concerning the second graphical object 180 to render, on the graphical user interface 160, the portion of the first graphical object 170 selected by the user 108 to appear to be connected to the second graphical object 180. In this example, the text object (i.e., the first graphical object 170) renders the tail of the text object on the graphical user interface 160 to appear as though it is attached to the image (i.e., the second graphical object 180). In other words, on the graphical user interface 160, the tail of the text object (i.e., the first graphical object 170) appears to be attached to the image (i.e., the second graphical object 180).

In step 233, the object interacting process 140-2 detects movement of at least one of the first graphical object 170 and second graphical object 180 on the graphical user interface 160. For example, a user 108 might move either the text object (i.e., the first graphical object 170), the tail of the text object, or the image (i.e., the second graphical object 180) to which the tail of the text object is attached.

In response to the detection of this movement, in step 234, the object interacting process 140-2 adjusts a graphical appearance of the portion of the first graphical object 170 connected to the second graphical object 180 so that the portion remains visually connected to between the first graphical object 170 and the second graphical object 180. For example, if a user 108 moves the either the text object (i.e., the first graphical object 170), the tail of the text object, or the image (i.e., the second graphical object 180) to which the tail of the text object is attached, the object interacting process 140-2 redraws the text object (i.e., the first graphical object 170), the tail of the text object, and the image (i.e., the second graphical object 180) to reflect both the movement and the new positioning within the graphical user interface 160 of the text object (i.e., the first graphical object 170), the tail of the text object, and the image (i.e., the second graphical object 180). In one example configuration, the image (i.e., the second graphical object 180) is not aware that the tail of the text object (i.e., the first graphical object 170) is associated (i.e., attached) to the second graphical object 180.

In one example configuration, the first graphical object 170 is a timeline object and the second graphical object 180 is an image object. In step 235, the object interacting process 140-2 inserts the image object into the timeline object in a section on the timeline where a timestamp of the section corresponds to a timestamp of the image object. In an example configuration, the second graphical object 180 can drive the layout and/or location of the first object graphical object 170. The user 108 does not need to figure out where to place the content—it is automatically laid out for them in an intuitive manner (chronologically and arranged so content pieces do not overlap). A timeline can have different content types associated with it—a photo, a calendar, slide show, etc. The individual content pieces do not have to know about each other. These individual content pieces may be altered so as to be appropriate given the context of the timeline. The size and other meta data related to the content piece may be altered displayed.

In step 236, the object interacting process 140-2 alters the image object such that the timestamp of the image object is visible to a user 108. For example, the image may be altered to include a timestamp that matches the section in the timeline where the image has been inserted.

FIG. 8 is a flowchart of the steps performed by the object interacting process 140-2. In step 237, the object interacting process graphically alters a representation of at least one of the first graphical object 170 and the second graphical object 180 on the graphical user interface 160 in response to the formation of the association 190 with each other.

In step 238, the object interacting process 140-2 detects a granularity of proximity between the first graphical object 170 and the second graphical object 180. The object interacting process 140-2 detects spatial proximity as well as the granularity of that spatial proximity. For example, the object interacting process 140-2 detects the movement of a first graphical object 170 to a second graphical object 180 and also detects how close the first graphical object 170 is to the second graphical object 180.

In step 239, the object interacting process 140-2 alters a representation of at least one of the first graphical object 170 and the second graphical object 170, based on the granularity of proximity. For example, if a text object (i.e., a first graphical object 170) moves on top of an image object (i.e., a second graphical object 180), such that the text object is occluding the image object, the object interacting process 140-2 alters the background of the text object, making the background transparent such that the image object could still be visible beneath the text object.

Alternatively, in step 240, the object interacting process 140-2 changes a visual appearance of at least one of the first graphical object 170 and the second graphical object 180 on the graphical user interface 160, based on presence information exchanged between the first graphical object 170 and the second graphical object 180. The presence information includes a distance of spatial proximity between the first graphical object 170 and the second graphical object 180.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A computer-implemented method in which a computer system initiates execution of software instructions stored in memory to provide interaction between graphical objects and a management application, the computer-implemented method comprising:
   detecting that a first graphical object is moved within a spatial proximity of a second graphical object in a graphical user interface;
   in response to the detecting, notifying the first graphical object of presence information related to the second graphical object;
   forming an association between the first graphical object and the second graphical object; and
   graphically altering a representation of the first graphical object in response to formation of the association;
      wherein graphically altering the representation of the first graphical object further comprises modifying the representation of the first graphical object based on an exchange of information from the second graphical object to the first graphical object; and
      wherein modifying the representation of the first graphical object further comprises displaying the representation of the first graphical object to include information received from the second graphical object.

2. The computer-implemented method of claim 1 wherein the presence information includes at least an identity of the second graphical object and
   wherein the first graphical object is rendered on the graphical user interface by a first independently executing software process and
   wherein the second graphical object is rendered on the graphical user interface by a second independently executing software process, and comprising:
      forming the association between the first graphical object and the second graphical object based on the presence information.

3. The computer-implemented method of claim 2 wherein the spatial proximity indicates that the first graphical object is nearby but not overlapping any portion of the second graphical object.

4. The computer-implemented method of claim 2 wherein notifying the first graphical object of presence information related to the second graphical object comprises:
   using the management application, notifying the first graphical object of presence information, the presence information selected from the group consisting of:
      i) an interface the second graphical object publishes;
      ii) data the second graphical object publishes;
      iii) an interface the second graphical object consumes; and
      iv) data the second graphical object consumes.

5. The computer-implemented method of claim 4 wherein the management application performs the operations of detecting that movement of a first graphical object relative to a second graphical object on the graphical user interface, and notifying the first graphical object of presence information related to the second graphical object; and wherein notifying the first graphical object of presence information related to the second graphical object comprises:

notifying the first graphical object of only one of either the interfaces or data published by the second graphical object that are consumed by the first graphical object.

6. The computer-implemented method of claim 5 comprising:

notifying the second graphical object of only one of either of the interfaces or data published by the first graphical object that are consumed by the second graphical object.

7. The computer-implemented method of claim 2 wherein forming the association between the first graphical object and the second graphical object based on the presence information comprises:

in the first graphical object, receiving presence information from the second graphical object indicating at least one of data or interfaces available for communication with the second graphical object; and in the second graphical object, receiving presence information from the first graphical object indicating at least one of data or interfaces available for communication with the first graphical object.

8. The computer-implemented method of claim 2 wherein forming the association between the first graphical object and the second graphical object based on the presence information comprises:

negotiating communication between the first graphical object and the second graphical object using presence information notified to the first and second graphical objects by the management application, the communication allowing an exchange of object information between the first and second graphical objects that is not supplied by the management application; and exchanging object information between the first graphical object and the second graphical object.

9. The computer-implemented method of claim 2 wherein graphically altering a representation of either the first graphical object or the second graphical object on the graphical user interface comprises:

changing a visual appearance of either the first graphical object or the second graphical object on the graphical user interface based on presence information exchanged between the first graphical object and the second graphical object, the presence information including a distance of spatial proximity between the first and second graphical objects.

10. The computer-implemented method of claim 2 wherein graphically altering a representation of either the first graphical object or the second graphical object on the graphical user interface comprises:

detecting a granularity of proximity between the first graphical object and the second graphical object; and altering a representation of either the first graphical object or the second graphical object, based on the granularity of proximity.

11. The computer-implemented method as in claim 1 further comprising:

graphically altering a representation of the second graphical object in response to formation of the association.

12. The computer-implemented method as in claim 1 further comprising:

generating a name for the second graphical object based on an exchange of information transmitted from the first graphical object to the second graphical object; and displaying the name associated with second graphical object in a directory.

13. The computer-implemented method as in claim 1, wherein graphically altering the representation of the first graphical object further comprises:

aligning the first graphical object and the second graphical object with each other in the graphical user interface.

14. The computer-implemented method as in claim 1, wherein graphically altering the representation of the first graphical object further comprises:

modifying the first graphical object to be closer in size to the representation of the second graphical object in response to detecting that the first graphical object is moved in close proximity to the representation of the second graphical object.

15. The computer-implemented method as in claim 1 further comprising:

initiating a first modification to the representation of the first graphical object in response to detecting that the representation of the first graphical object and the representation of the second graphical object are within a first threshold distance from each other;

initiating a second modification to the representation of the first graphical object in response to detecting that the representation of the first graphical object and the representation of the second graphical object are within a second threshold distance from each other; and wherein the first threshold distance is greater than the second threshold distance.

16. The computer-implemented method as in claim 1, wherein graphically altering the representation of the first graphical object further comprises:

attaching the representation of the first graphical object to a date in a timeline displayed in the representation of the second graphical object.

17. The computer-implemented method as in claim 1, wherein graphically altering the representation of the first graphical object further comprises:

modifying an appearance of the representation of the first graphical object to include a name associated with the second graphical object to indicate that the first graphical object is associated with the second graphical object.

18. The computer-implemented method as in claim 16, wherein the first graphical object is a task and the second graphical object is a timeline; and wherein modifying the appearance includes displaying the task to include a name associated with the timeline in response to detecting that an image representing the task is in close proximity to an image representing the timeline.

19. The computer-implemented method as in claim 1, further comprising:

graphically altering a representation of the second graphical object in response to formation of the association;

wherein graphically altering the representation of the second graphical object further comprises modifying the representation of the second graphical object based on an exchange of information from the first graphical object to the second graphical object; and wherein modifying the representation of the second graphical object further comprises displaying the representation of the second graphical object to include information received from the first graphical object.

20. A computer-implemented method in which a computer system initiates execution of software instructions stored in memory to provide interaction between graphical objects and a management application, the computer-implemented method comprising:

detecting that movement of a first graphical object relative to a second graphical object on a graphical user interface is within a spatial proximity, the first graphical object being rendered on the graphical user interface by a first independently executing software process, the second graphical object being rendered on the graphical user interface by a second independently executing software process;

in response to the detecting, notifying the first graphical object of presence information related to the second graphical object comprising:

identifying and notifying the first graphical object of presence information published by the second graphical object that matches presence information consumed by the first graphical object; and identifying and notifying the second graphical object of presence information published by the first graphical object that matches presence information consumed by the second graphical object; and forming an association between the first graphical object and the second graphical object based on the presence information.

21. The computer-implemented method of claim 20 wherein forming the association between the first graphical object and the second graphical object based on the presence information comprises:

the first graphical object using the presence information to perform communications with the second graphical object, the communications allowing the first graphical object to create the association to the second graphical object;

the first graphical object indicating the association formed to the second graphical object to the management application.

22. The computer-implemented method of claim 21 wherein the association formed between the first and second graphical objects is dependent upon a distance of the spatial proximity between the first and second graphical objects on the graphical user interface.

23. The computer-implemented method of claim 22 wherein graphically altering a representation of either the first graphical object or the second graphical object on the graphical user interface in response to the formation of the association with each other comprises:

changing an appearance of the first graphical object on the graphical user interface to reflect the spatial proximity of the first graphical object to the second graphical object.

24. A computer-implemented method in which a computer system initiates execution of software instructions stored in memory to provide interaction between graphical objects and a management application, the computer-implemented method comprising:

detecting that movement of a first graphical object relative to a second graphical object on a graphical user interface is within a spatial proximity, the first graphical object is rendered on the graphical user interface by a first independently executing software process, the second graphical object is rendered on the graphical user interface by a second independently executing software process;

at the first graphical object, receiving a user selection of a portion of the first graphical object on the graphical user interface; and detecting that the user has graphically manipulated the portion of the first graphical object to be within a predetermined distance from the second graphical object;

notifying the first graphical object of presence information related to the second graphical object comprising:

indicating, to the first graphical object, a connection interface of the second graphical object that can be called by the first graphical object to obtain connection information concerning the second graphical object to allow the portion of the first graphical object to be graphically connected with the second graphical object;

forming an association between the first graphical object and the second graphical object based on the presence information comprising:

the first graphical object calling the connection interface to obtain the connection information concerning the second graphical object; and the first graphical object receiving the connection information concerning the second graphical object; and graphically altering a representation of either the first graphical object or the second graphical object on the graphical user interface comprising:

the first graphical object using the connection information concerning the second graphical object to render, on the graphical user interface, the portion of the first graphical object selected by the user to appear to be connected to the second graphical object.

25. The computer-implemented method of claim 24 comprising:

detecting movement of either the first or the second graphical object on the graphical user interface;

in response, adjusting a graphical appearance of the portion of the first graphical object connected to the second graphical object so that the portion remains visually connected to between the first graphical object and the second graphical object.

26. The computer-implemented method of claim 25 wherein the second graphical object is not aware that the first graphical object is associated with the second graphical object.

27. The computer-implemented method of claim 24 wherein the first graphical object is a text object and the second graphical object is an image object.

28. The computer-implemented method of claim 24 wherein the first graphical object is a timeline object and the second graphical object is an image object and wherein graphically altering a representation of either the first graphical object or second graphical object on the graphical user interface comprises:

inserting the image object into the timeline object in a section on the timeline where a timestamp of the section corresponds to a timestamp of the image object; and altering the image object such that the timestamp of the image object is visible to a user.

29. A computerized device comprising:

a memory;

a processor;

a communications interface;

an interconnection mechanism coupling the memory, the processor and the communications interface;

wherein the memory is encoded with executable instructions stored thereon that when executed on the processor, causes the computerized device to perform the operations of:

detecting that a first graphical object is moved within a spatial proximity of a second graphical object in a graphical user interface;

in response to the detecting, notifying the first graphical object of presence information related to the second graphical object, the presence information including at least an identity of the second graphical object;

forming an association between the first graphical object and the second graphical object based on the presence information; and graphically altering a representation of the first graphical object in response to formation of the association by modifying the representation of the first graphical object based on an exchange of information from the second graphical object to the first graphical object and displaying the representation of the first graphical object to include information received from the second graphical object.

30. The computerized device of claim 29 wherein when the computerized device performs the operation of detecting that movement of a first graphical object relative to a second graphical object on the graphical user interface is within a spatial proximity, the computerized device performs the operations of:

at the first graphical object, receiving a user selection of a portion of the first graphical object on the graphical user interface; and detecting that the user has graphically manipulated the portion of the first graphical object to be within a predetermined distance from the second graphical object;

and wherein when the computerized device performs the operation of notifying the first graphical object of presence information related to the second graphical object, the computerized device performs the operation of:

indicating, to the first graphical object, a connection interface of the second graphical object that can be called by the first graphical object to obtain connection information concerning the second graphical object to allow the portion of the first graphical object to be graphically connected with the second graphical object;

and wherein when the computerized device performs the operation of forming an association between the first graphical object and the second graphical object based on the presence information, the computerized device performs the operations of:

the first graphical object calling the connection interface to obtain the connection information concerning the second graphical object; and the first graphical object receiving the connection information concerning the second graphical object;

and wherein when the computerized device performs the operation of graphically altering a representation of either the first graphical object or the second graphical object on the graphical user interface, the computerized device performs the operation of:

the first graphical object using the connection information concerning the second graphical object to render, on the graphical user interface, the portion of the first graphical object selected by the user to appear to be connected to the second graphical object.

31. A computer-readable storage medium having executable instructions stored thereon that, when executed on a processor in a computerized device, cause the computerized device to perform the operations of:

detecting that a first graphical object is moved within a spatial proximity of a second graphical object in a graphical user interface;

in response to the detecting, notifying the first graphical object of presence information related to the second graphical object, the presence information including at least an identity of the second graphical object;

forming an association between the first graphical object and the second graphical object based on the presence information; and graphically altering a representation of the first graphical object in response to formation of the association by modifying the representation of the first graphical object based on an exchange of information from the second graphical object to the first graphical object and displaying the representation of the first graphical object to include information received from the second graphical object.

* * * * *

UNITED STATES PATENT AND TRADEMARK OFFICE
CERTIFICATE OF CORRECTION

PATENT NO. : 7,589,749 B1
APPLICATION NO. : 11/204740
DATED : September 15, 2009
INVENTOR(S) : De Laurentis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this

Twenty-first Day of September, 2010

David J. Kappos
*Director of the United States Patent and Trademark Office*